United States Patent [19]

Scholer

[11] Patent Number: 4,763,709

[45] Date of Patent: Aug. 16, 1988

[54] TIRE INFLATION SYSTEM

[75] Inventor: Richard A. Scholer, Hoagland, Ind.

[73] Assignee: Teledyne Industries Inc., Los Angeles, Calif.

[21] Appl. No.: 881,592

[22] Filed: Jul. 3, 1986

[51] Int. Cl.[4] ...................... B60C 23/10; B60C 29/00
[52] U.S. Cl. .................................. 152/416; 73/146.2;
141/38; 141/83; 180/211; 180/290; 307/10 R;
340/58; 364/558
[58] Field of Search ............................... 152/415–417,
152/427, 429; 141/38, 95, 83, 39–41; 137/224,
223; 73/146.2, 146.5; 340/58; 267/64.16, 64.17,
DIG. 1, DIG. 2; 307/10 R; 364/558; 180/271,
290; 280/707

[56] References Cited

U.S. PATENT DOCUMENTS

| 3,099,309 | 7/1963 | Horta et al. | 152/416 |
| 3,102,573 | 9/1963 | VanWinsen et al. | 152/416 |
| 3,835,451 | 9/1974 | Church | 340/58 |
| 3,911,434 | 10/1975 | Cook | 343/6.5 |
| 3,927,708 | 12/1975 | Hulme | 152/418 |
| 3,971,425 | 7/1976 | Tsuruta | 152/418 |
| 4,090,172 | 5/1978 | Vesnic | 340/58 |
| 4,103,283 | 7/1978 | Lee | 340/58 |
| 4,117,281 | 9/1978 | Leimbach | 200/61 |
| 4,157,530 | 6/1979 | Merz | 340/58 |
| 4,163,208 | 7/1979 | Merz | 340/58 |
| 4,311,985 | 1/1982 | Gee et al. | 340/58 |
| 4,313,483 | 2/1982 | Brockmann | 340/58 |
| 4,316,176 | 2/1982 | Gee et al. | 340/58 |
| 4,330,774 | 5/1982 | Doty | 340/58 |
| 4,348,654 | 9/1982 | Matsuda et al. | 340/58 |
| 4,363,020 | 12/1982 | Venema | 340/58 |
| 4,386,247 | 5/1983 | Count | 200/600 |
| 4,387,931 | 6/1983 | Bland | 303/13 |
| 4,418,737 | 12/1983 | Goodell et al. | 152/416 |
| 4,421,151 | 12/1983 | Stumpe | 152/417 |
| 4,456,038 | 6/1984 | Gwaltney et al. | 152/415 X |
| 4,619,303 | 10/1986 | Bryan et al. | 152/415 X |

Primary Examiner—Michael Ball
Assistant Examiner—Thomas Bokan
Attorney, Agent, or Firm—Gifford, Groh, VanOphem, Sheridan, Sprinkle and Dolgorukov

[57] ABSTRACT

The present invention discloses a system for varying the inflation pressure in the tires of a vehicle in order to obtain an operator selected tire deflection. The system includes a source of pressure which is fluidly connected through an inflation valve to the tires which, upon actuation, increases the tire pressure. Conversely, a deflation valve is also connected to the tire and, upon actuation, exhausts fluid from the tires thus decreasing the tire pressure. A pressure sensor detects the pressure representative of the pressure within the tires and a further sensor detects the vehicle load while a switch arrangement allows the operator to select between at least two different tire deflection levels. An electronic control unit receives input signals from the pressure and further sensors as well as from the switch arrangement and selectively actuates the inflation or deflation valves until a tire pressure corresponding to the desired tire deflection is obtained.

12 Claims, 2 Drawing Sheets

TIRE INFLATION SYSTEM

BACKGROUND OF THE INVENTION

I. Field of the Invention

The present invention relates to a tire inflation system for a vehicle which enables the tires to be inflated or deflated to operate the vehicle at selected tire deflection levels.

II. Description of the Prior Art

For multi-terrain vehicles, the overall operational efficiency of the vehicle varies as a function of the tire deflection. For example, a relatively high tire pressure inflation, and thus a low tire pressure deflection, is desired for highway travel to minimize tire wear while maximizing fuel mileage. Conversely, a lower tire pressure, and thus a higher tire deflection, is desired for cross country terrain. Such low tire pressures permit more tire deflection and produce a larger tire footprint for increased traction. Tire wear and fuel consumption are not significantly adversely affected by the increased tire deflection when travelling cross country since lower vehicle speeds are normally encountered than with highway travel.

Likewise, even lower tire inflation pressure, and thus higher tire deflection, is desired when the vehicle is travelling through soft earth or sand. Such lower tire pressures create even greater tire deflection thus increasing the tire footprint and traction. Since only very low speeds are encountered when travelling through sand or soft earth, even very low tire pressures do not significantly adversely affect the tire wear or fuel consumption for the vehicle. An even lower tire pressure inflation, and thus maximum tire deflection, is desirable for an emergency situation, such as when the vehicle is stuck, since maximum tire traction is of the utmost importance.

Previously, the tires on a multi-terrain vehicle have been inflated to a compromise pressure so that the vehicle can accommodate different types of terrain without adjustment of the tire pressure. By using a compromise tire inflation pressure, however, the vehicle obtains less than optimum performance for traction, tire wear and fuel consumption.

Furthermore, it is not possible to accurately control the amount of tire deflection by merely changing the tire pressure since the amount of tire deflection is directly proportional to the vehicle load. For example, the amount of tire deflection for a fully loaded vehicle is much greater than the tire deflection for an empty vehicle even though the tire inflation pressures are identical. Furthermore, the amount of tire deflection usually varies between the front and rear tires, even when inflated to the same pressure.

SUMMARY OF THE PRESENT INVENTION

The present invention provides a system which overcomes all of the above mentioned disadvantages for the previously known multi-terrain vehicles.

In brief, the system of the present invention includes a source of air or fluid pressure which is fluidly connected to the tires through an inflation valve and conduit. The inflation valve is normally closed but, upon actuation, fluidly connects the pressure source to the tires thereby increasing the tire pressure. Similarly, a deflation valve is connected to the conduit and, when actuated, exhausts air from the tires thus reducing the tire pressure.

An accumulator or static tank is also fluidly connected to the conduit and a pressure transducer is mounted on the accumulator. This pressure transducer generates an output signal representative of the accumulator pressure which, in turn, is representative of the tire pressure. The system also includes a further transducer which generates an output signal representative of the vehicle load. In the preferred form of the invention, the vehicle includes an air suspension system and the second transducer comprises a pressure transducer which is connected to the air suspension system and generates an output signal representative of the pressure in the system. Thus, of the vehicle load increases, the pressure in the air suspension system increases and vice versa.

A selector circuit, accessible to the vehicle operator, allows the vehicle operator to select between at least two, and preferably four, different tire deflection levels. These different tire deflection levels can correspond, for example, to highway travel, cross country travel, soft earth travel and an emergency situation.

The outputs from the tire pressure transducer, the load transducer as well as the selector circuit are electrically connected to an electronic control unit. This electronic control unit reads the value from both the selector circuit as well as the load transducer and, from these values, determines the tire pressure inflation necessary to achieve the desired or selected tire deflection level.

In the event that the actual tire pressure is above the tire pressure necessary to achieve the necessary tire deflection, the electronic control unit actuates the deflation valve thus exhausting pressure from the tires until the desired tire pressure is obtained at which time the deflation valve is again closed. Conversely, if the desired tire pressure is greater than the actual tire pressure, the electronic control unit actuates the inflation valve in order to increase the tire pressure. When the actual tire pressure corresponds to the desired tire pressure necessary to achieve the desired tire deflection, the electronic control unit again deactuates or closes the inflation valve. Once the inflation or deflation valve is closed by the electronic control unit, these valves remain closed until a new tire deflection level is selected from the selector circuit.

In the preferred form of the invention, the vehicle has at least a pair of rear wheels and a pair of front wheels and the tire pressure of the front wheels is controlled independently of the tire pressure in the rear wheels. Consequently, a separate inflation valve, deflation valve, tire pressure transducer and load transducer are associated with the front tires than with the rear tires. This provision thus allows careful control of the tire deflection for both the front and rear tires since the load on both the front and rear tires oftentimes vary dramatically from each other.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
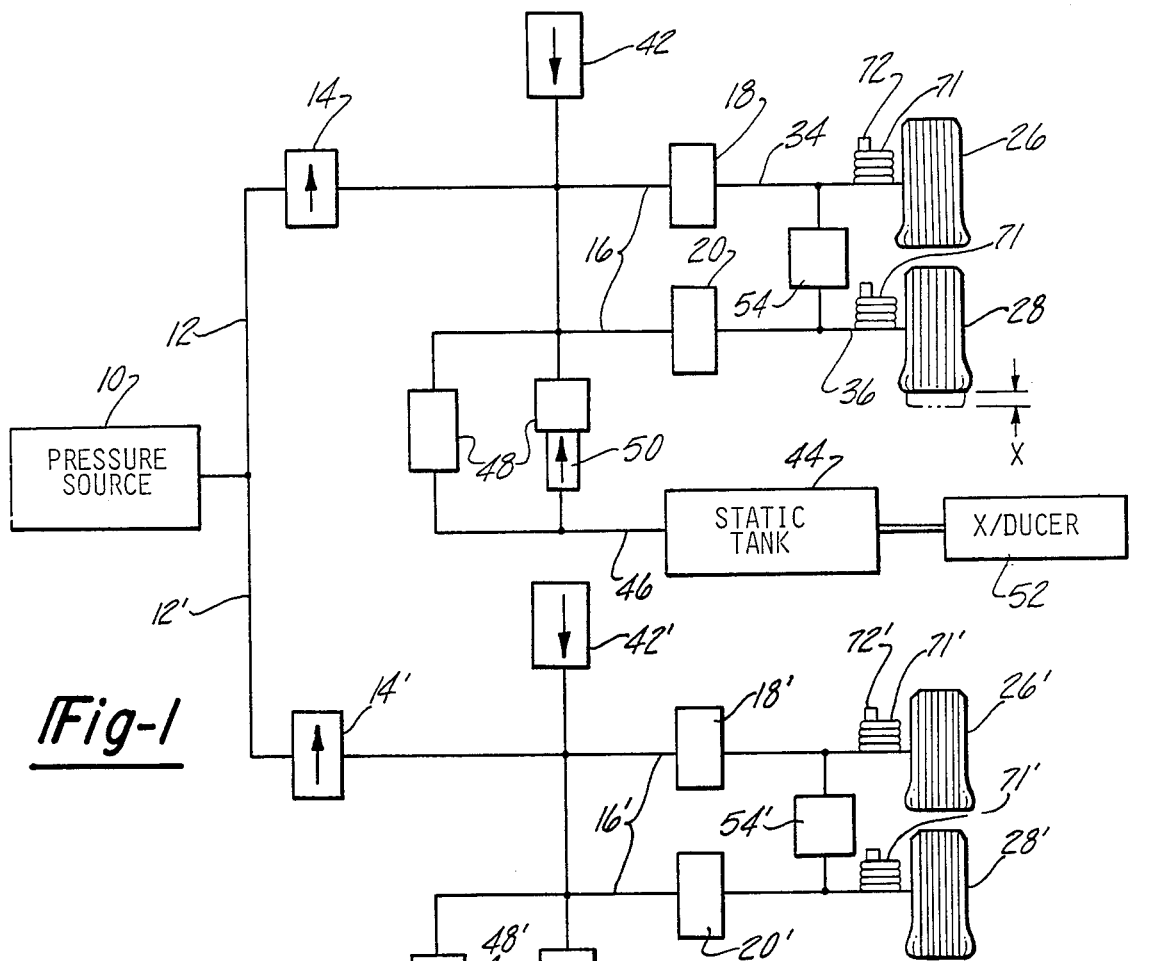
FIG. 1 is a schematic diagram of the pneumatic system for the preferred embodiment of the invention.

With reference first to FIG. 1, a schematic view of the fluid or pneumatic system of the preferred embodiment of the present invention is thereshown for use with a vehicle having two front tires 26 and 28 and two rear tires 26' and 28'. The pneumatic system of the present invention for the front two tires 26 and 28 is substantially identical to the pneumatic system for the rear tires 26' and 28'. Consequently, only the pneumatic system for the front two tires 26 and 28 will be described in detail, it being understood that a like description will also apply to the pneumatic system for the rear two tires 26' and 28'. The components of the pneumatic system for the rear two tires 26' and 28' are identified in the drawing by the reference number corresponding to the components in the pneumatic system for the front two tires 26 and 28 following by a prime.

Still referring to FIG. 1, the pneumatic system comprises a fluid source 10 such as an air pump, which is connected by a conduit 12 to one side of an inflation valve 14. The inflation valve 14 is preferably a normally closed solenoid valve which opens when actuated by an appropriate electrical signal.

The other side of the inflation valve 14 is connected by a conduit 16 to one side of two shut off valves 18 and 20 which are also preferably normally closed solenoid valves. The shut off valves 18 and 20 are opened or actuated only by the receipt of the appropriate electrical signal.

One shut off valve 18 is associated with the tire 26 while the other shut off valve 20 is associated with the other tire 28. Thus, a conduit 34 fluidly connects the other side of the shut off valve 18 to the tire 26 while a conduit 36 fluidly connects the other side of the shut off valve 20 to the tire 28.

Still referring to FIG. 1, a deflation valve 42 has one side fluidly connected to the conduit 16 while its other side is open to the atmosphere. Thus, assuming that the shut off valves 18 and 20 are open, upon opening the deflation valve 42, the deflation valve 42 exhausts air from the tires 26 and 28 and thus reduces the tire pressure.

A static tank or accumulator 44, which may comprise the spare tire for the vehicle, is fluidly connected by a conduit 46 and needle valve 48 to the conduit 16. Thus, with the shut off valves 18 and 20 open, the pressure within the accumulator 44 is representative of the pressure within the tires 26 and 28. A check valve 50 is connected in series with one needle valve 48 so that the pressure exhausts from the accumulator 44 through both needle valves 48, but preferably inflates only through one needle valve 48 to allow more rapid inflation than deflation. The needle valves 48 meter the air flow into and out from the tank 44 to approximate the air flow rate into and out from the tires 26 and 28 so that the pressure in the tank 44 closely approximates the tire pressure.

Still referring to FIG. 1, a pressure transducer 52 is open to and measures the pressure within the accumulator 44. This pressure transducer 52 generates an electrical output signal which is representative of the pressure within the accumulator 44 and thus representative of the pressure within the tires 26 and 28.

A differential pressure switch 54 is fluidly connected between the conduits 34 and 36. The differential pressure switch 54 includes a diaphragm which at a predetermined differential pressure (5 psi) between the tires 26 and 28, activates one of the switches 70 shown in FIG. 2. This will electrically interrupt the normal operating power to the solenoid valve 18 or 20 connected to the tire, 26 or 28 that has the lower pressure. This isolates the pneumatic circuit for a low pressure tire from the system for purposes of a blowout so the remaining tires maintain system pressure.

Figure 2:
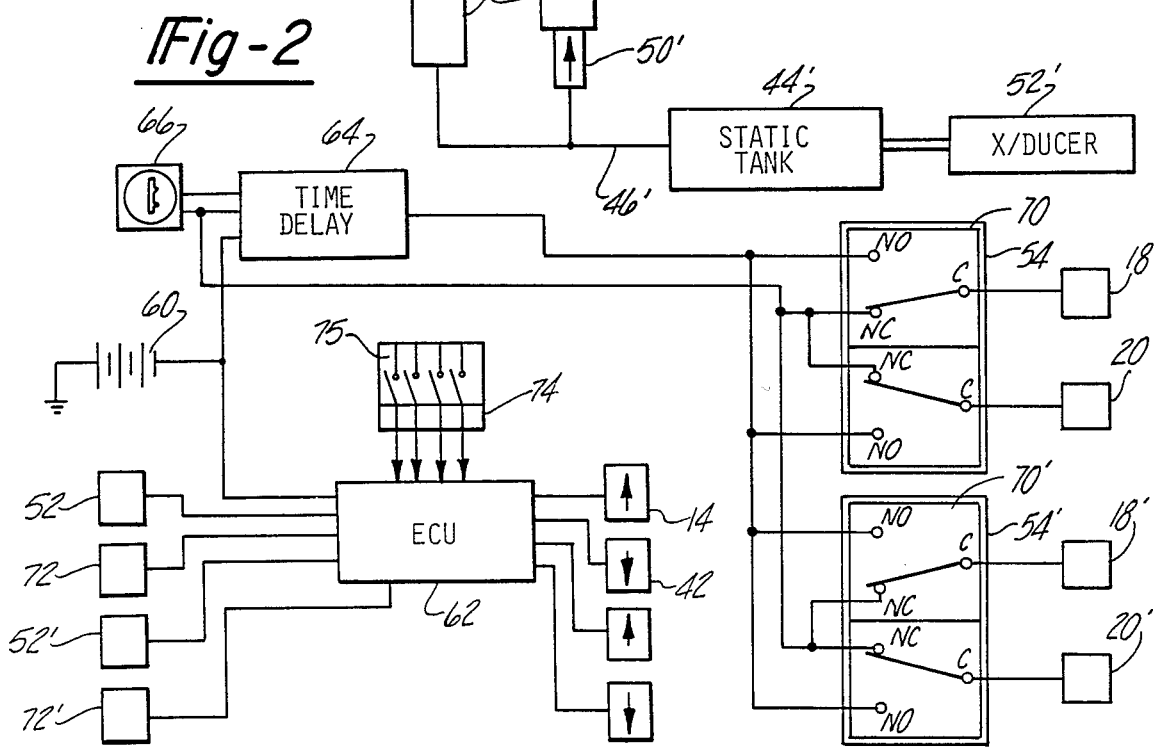
FIG. 2 is a schematic diagram of the electrical system for the preferred embodiment of the invention.

With reference now to FIG. 2, a schematic diagram of the electrical control system for the preferred embodiment of the present invention is thereshown. This electrical control system includes a battery 60 which is electrically connected to and powers both an electrical control unit 62 and a time delay relay 64. The vehicle includes a conventional ignition system having an ignition switch 66 which forms a second input (run and start circuit) to the time delay relay 64.

Assuming that the normally closed switch 70 in the differential pressure switch 54 has been activated due to a particular tire 26 or 28 becoming flat or low during storage or through an extended period of non-use, the initial start sequence of the vehicle engine initiates the time delay relay 64 cycle for a predetermined time period, for example five minutes and electrically connects the output from the run position of the ignition switch, through the time delay relay 64, and through the now connected normally open to common switch contact, of the switch 70 included with the differential pressure switch to the associated shut off valve 18 or 20 thus fluidly connecting the conduit 16 (FIG. 1) to the tire 26 or 28.

Electrical power from the run circuit is used because after the vehicle starts, power from the start circuit is removed. The battery power to the time delay relay 64 allows the "latched in" run power through the relay for the selected time period.

If this procedure were not used to initially equalize the system pressure, a low pressure tire may not be visually detected and would remain pneumatically isolated from the system during vehicle operation.

After the tires have equatized in pressure, which may be lower than the desired system pressure, the diaphragm in the differential pressure switch 50 returns to its center position allowing electrical power to the shut off valves 18 or 20 through the normally closed to common contacts of the switch 70.

This also provides a method for a spare tire installed on the vehicle to be equalized in pressure with the system pressure. Assuming that the vehicle engine is turned off during spare tire installation and the spare tire is at a pressure higher than the system, the diaphragm in the differential pressure switch 54 would activate the switch 70 for the tire 26 or 28 on the opposite side of the vehicle. If the spare tire were installed on the front of the vehicle it would equalize with the rear tires 26' and 28' and may be at a higher equalization pressure then the isolated tire opposite the spare. Activation of the ignition switch 66 start sequence would start the vehicle engine and initiate the time delay relay 64 cycle reconnecting the isolated tire in the method previously described.

The shut off valves 18 and 20 are normally closed and the tires 26 and 28 are pneumatically isolated from each other. Consequently, the shut off valves 18 and 20 prevent all of the tires from becoming flat in the event that one of the tires becomes flat during storage or through an extended period of non-use.

Still referring to FIG. 2, the electrical control unit 62 receives an input signal from the pressure transducer 52 which is representative of the pressure within the accumulator 44. A further pressure transducer 72 also provides an electrical input signal to the electrical control unit which is representative of the load supported by the tires 26 and 28. In the preferred embodiment of the invention, the vehicle includes an air suspnsion system 71 (illustrated diagrammatically in FIG. 1) and the transducer 72 comprises a pressure transducer which measures the pressure within the air suspension system 71. In the well known fashion, as the load on the tires 26 and 28 increases, the pressure in the air suspension system 71 proportionally increases. It will be understood, however, that other types of transducers may be alternately employed to measure the load on the tires 26 and 28 without deviation from the spirit or scope of the invention.

Still referring to FIG. 2, the electrical control unit 62 also receives an input signal from a switch bank 74 having at least two and preferably four switches 75 which are accessible to the vehicle operator. Each switch 75 in the switch bank 74 is representative of a different level of desired tire deflection X (FIG. 2) for the vehicle in order to accommodate different ground terrains. For example, a relatively low tire deflection would be desirable for highway driving in order to minimize fuel consumption and tire wear. Conversely, a higher tire deflection is desirable for cross country travelling in order to increase the tire traction where tire wear and fuel consumption are less important due to slower anticipated speeds. A third and still higher tire deflection level would be desirable for travelling over sand and soft earth while an even still greater tire deflection is desirable for maximum traction in an emergency situation, such as when the vehicle is stuck.

The amount of deflection for the tires 26 and 28 is proportional to the load on the tires 26 and 28 and inversely proportional to the tire pressure. Since the electronic control unit 62 receives input signals representative of both the tire pressure and the load on the tires 26 and 28, the air pressure necessary to obtain a user selected tire deflection X can be determined from precalculated values. In the event that the actual tire pressure is below the pressure necessary to obtain the necessary tire deflection, the electronic control unit 62 actuates the inflation valve 14 thereby increasing the pressure to the tires 26 and 28 until the calculated tire pressure necessary to obtain the desired tire deflection X is obtained. At that time, the electrical control unit 62 deactuates or closes the inflation valve 14. Conversely, if the actual tire pressure is above the tire pressure determined necessary to obtain the desired tire deflection X as selected from the switch banks 74, the electrical control unit 62 activates the deflation valve 42 thus exhausting air pressure from the tires 26 and 28 until the necessary tire pressure is obtained. The deflation valve 42 is then closed.

Figure 3:
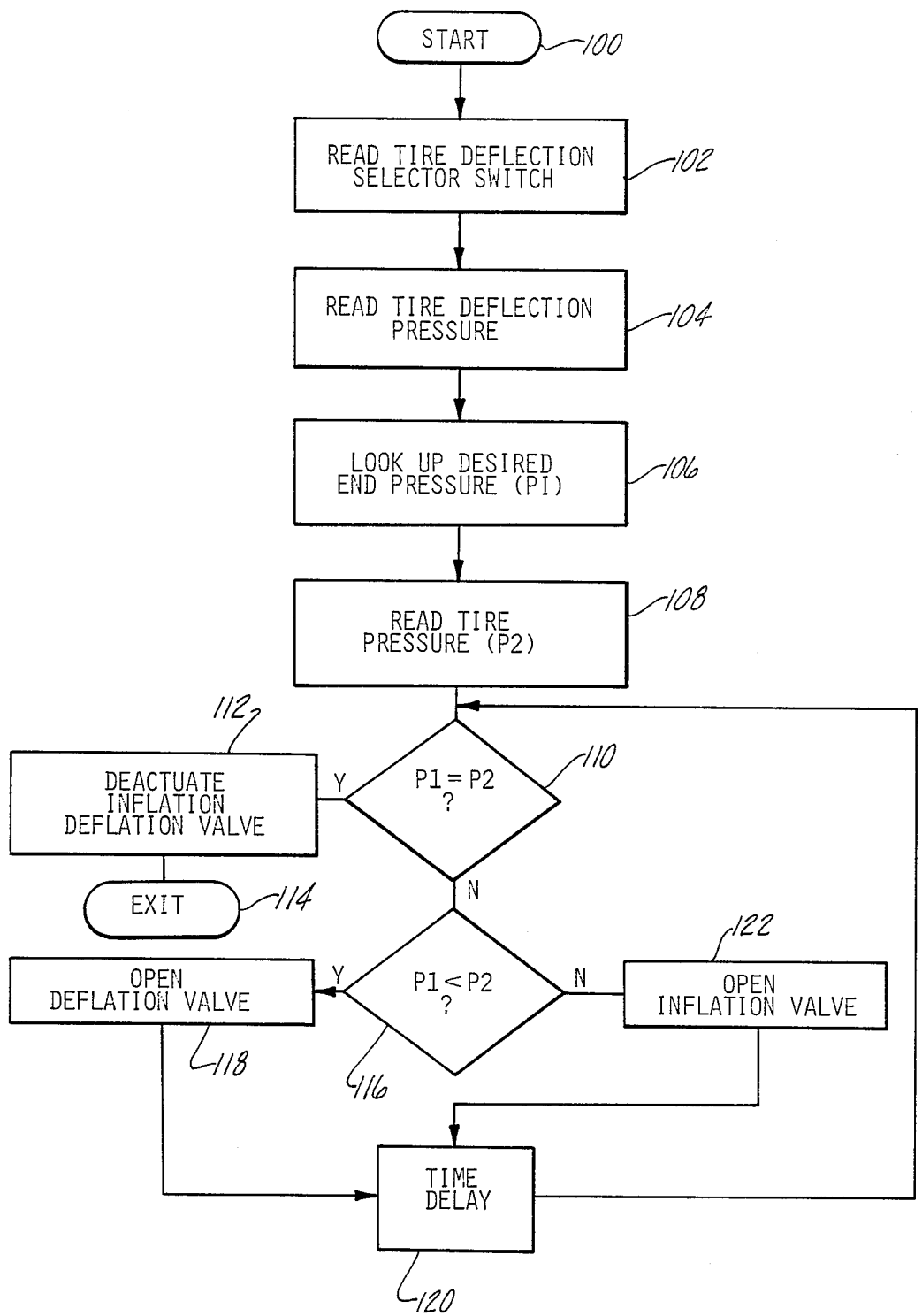
FIG. 3 is a flow chart illustrating the operation of the preferred embodiment of the invention.

With reference now to FIG. 3, an exemplary flow chart to control the actuation of the inflation valve 14 and deflation valve 42 is thereshown. The method initiates at step 100 whenever a different setting is selected on the switch bank 74 and step 100 branches to step 102. At step 102 the electrical control unit 64 reads the desired tire deflection from the switch bank 64 branches to step 104.

At step 104 the electrical control unit 62 reads the tire load from the transducer 72 and then branches to step 106. At step 106 the electrical control unit determines, either by calculation or through accessing a previously established pressure table, the tire pressure $P_1$ necessary to obtain the desired tire deflection in view of the load on the tires 26 and 28.

At step 108 the electrical control unit 62 reads the actual tire pressure $P_2$ from the transducer 52 and at step 110 compares the actual tire pressure $P_2$ to the pressure $P_1$. If these pressures are equal, step 110 branches to step 112 where the inflation valve 14 and deflation valve 42 are deactuated, or closed, and then exit at step 114 until the switch bank 74 is reset to a different selection.

Assuming that the actual tire pressure $P_2$ does not equal the necessary tire pressure $P_1$, step 110 branches to step 116 which compares these two tire pressures to each other. In the event that the actual tire pressure $P_2$ is greater than the desired pressure, step 116 branches to step 118 and actuates the deflation valve 42 in order to reduce the tire pressure. Step 118 then passes through a time delay 120 whereupon control is again returned to step 110 and the above process is repeated until $P_1$ equals $P_2$.

Conversely, if the desired pressure $P_1$ is less than the actual tire pressure $P_2$, step 116 branches to step 122 and actuates the inflation valve 14 in order to increase the tire pressure. Step 122 then passes through the time delay 120 and returns to step 110 whereupon the above process is repeated until $P_1$ equals $P_2$.

The electrical control unit 62 can comprise, for example, a microprocessor controlled circuit, hardwired logic circuit, or the like.

With reference now to both FIGS. 1 and 2, in the event of a tire blowout, a large differential pressure occurs between the tires 26 and 28 and thus between the conduits 34 and 36. This large differential pressure is detected by the differential pressure detector 54. Once detected, the switch in the switch pair 70 associated with the blown tire 26 or 28 opens and deactuates the shut off valve 18 or 20 associated with the blown tire 26 or 28. Once the shut off valve 18 or 20 is closed, the valves 18 or 20 pneumatically isolate their associated tires 26 or 28 from the other tire 26 or 28 to prevent the other tire from becoming flat.

From the foregoing, it can be seen that the present invention provides a system which enables the operator of a multi-wheeled vehicle to automatically adjust the tire deflection to two or more preselected levels in order to accommodate different types of terrain. Furthermore, the proper tire deflection is obtained independently of the vehicle load. A still further advantage of the present invention is its provision of independent systems for the front tires and the back tires since the load of the front tires is often different from the load on the rear tires.

Having described our invention, however, many modifications thereto will become apparent to those skilled in the art to which it pertains without deviation from the spirit of the invention as defined by the scope of the claims.

I claim:

1. For use with a vehicle having at least two tires, a system for varying the pressure in said tires to obtain a user selected tire deflection comprising:
   a source of fluid pressure,
   means for fluidly connecting said pressure source to the tires comprising a fluid conduit means and a first valve means connected in series in said fluid conduit means between said pressure source and said tire which, upon actuation, fluidly connects said fluid source to the tires, a second valve means connected to said conduit means which, upon actuation, exhausts fluid pressure from the tires, first means for measuring a parameter representative of tire load, second means for measuring a pressure representative of the tire pressure, means for selecting between at least two different tire deflection levels, means responsive to said first and second measuring means and said selecting means for selectively actuating said first or second valve means to obtain the selected tire deflection level.

2. The invention as defined in claim 1 wherein the vehicle includes an air suspension system and wherein said first measuring means comprises means for measuring the pressure in the air suspension system.

3. The invention as defined in claim 1 wherein said first and second valve means each comprises a normally closed, electrically operated valve.

4. The invention as defined in claim 1 wherein the vehicle includes an ignition system and comprising a normally closed shut off valve in series between said conduit means and each tire, means for opening said shut off valves upon activation of the vehicle ignition system.

5. The invention as defined in claim 4 wherein said shut off valve opening means comprises means for delaying the opening of said shut off valves until a predetermined time period following activation of the ignition system.

6. The invention as defined in claim 4 and comprising means for detecting rapid deflation of each tire, and means responsive to said detecting means for closing the shut off valve associated with the rapidly deflating tire.

7. The invention as defined in claim 6 wherein said detecting means comprises a differential pressure gauge connected between two tires.

8. The invention as defined in claim 1 and comprising a fluid pressure accumulator fluidly connected to said conduit means, said pressure measuring means being positioned in said accumulator.

9. The invention as defined in claim 8 and comprising means for restricting fluid flow between said conduit means and said accumulator.

10. The invention as defined in claim 9 wherein said restricting means comprises a needle valve.

11. The invention as defined in claim 9 wherein said restricting means comprises means for restricting the flow into said accumulator by a different amount than for restricting the fluid flow out of said accumulator.

12. For use with a vehicle having at least a front tire and a rear tire, a system for independently varying the pressure in each said tires to obtain a user selected tire deflection comprising:

a source of fluid pressure, means for fluidly connecting said pressure source to the tires comprising a fluid conduit means and a pair of first valve means, one first valve means connected in series in said fluid conduit means between said pressure source and each said tire which, upon actuation, fluidly connects said fluid source to its associated tire, a pair of second valve means, one valve means connected to said conduit means for each tire which, upon actuation, exhausts fluid pressure from its associated tire, first means for measuring a parameter representative of tire load for each tire, second means for measuring a pressure representative of tire pressure for each tire, means for selecting between at least two different tire deflection levels, means responsive to said first and second measuring means and said selecting means for selectively actuating said first or second valve means to obtain the selected tire deflection level in each tire.

* * * * *